United States Patent Office 2,912,427
Patented Nov. 10, 1959

2,912,427
PROCESS FOR THE MANUFACTURE OF GRAMICIDIN S

Robert Schwyzer, Beat Iselin, and Max Feurer, Riehen, Switzerland, assignors to Ciba Pharmaceutical Products Inc., Summit, N.J.

No Drawing. Application November 29, 1957
Serial No. 699,464

Claims priority, application Switzerland February 9, 1954

7 Claims. (Cl. 260—112)

The present application is a continuation-in-part of our co-pending application Serial No. 616,923, filed October 19, 1956, which itself is a continuation-in-part of application Serial No. 485,818, filed February 2, 1955, and now abandoned.

This invention relates to a novel and advantageous process for the manufacture of the antibiotic gramicidin S, which is a cyclic decapeptide in which the amino-acid sequence of (L - valine - L - ornithine - L - leucine - D-phenylalanine-L-proline) occurs twice.

In our application Serial No. 616,923, filed October 19, 1956, is described a process for the production of amides by reacting a carboxylic acid ester, which contains in the alcohol component an electron-attracting substituent, with an amine. That process is also utilized for the production of linear or cyclic polypeptides and for the manufacture of gramicidin S. In it a salt of a linear 10-membered proline ester corresponding to gramicidin, in which the δ-amino groups of the ornithine radicals are protected and which contains in the alcohol component an electron-attracting substituent, for example, the trifluoracetate of the corresponding decapeptide paranitrophenyl ester, is treated with a basic agent, and then the protected amino group is converted into a free amino group. This process is complicated in that it is necessary to prepare the salt of the decapeptide ester used as starting material in several stages of reaction from the pentapeptide.

The present invention is based on the unexpected observation that gramicidin S can be obtained in a simpler manner by treating with a basic agent a salt of a pentapeptide ester having the amino-acid sequence of gramicidin, that is to say, an L-valyl-L-ornithyl-L-leucyl-D-phenylalanyl-L-proline carboxylic acid ester, in which the δ-amino group of the ornithine radical is protected and which contains in the alcohol part at least one carbon-attached electron-attracting substituent, selected from the group consisting of

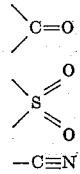

and

radicals, and then converting the protected δ-amino groups into free amino groups.

It is surprising that in this manner the pentapeptide molecule does not undergo ring closure with itself, but that two peptide molecules join together directly to form the cyclic decapeptide. Such a doubling of the ring components to form a cyclic polypeptide has been observed hitherto only in the case of c-hexaglycyl, which is obtained from the linear triglycine peptide, for example, by the process in our above mentioned application. This mode of reaction of triglycine derivatives has hitherto been regarded as an exception, which was probably due to an instability peculiar to c-triglycyl (see Helvetica Chimica Acta, vol. 39, page 879 (1956)). Other tripeptides such, for example, as glycyl-DL-phenylalanyl-glycine and glycyl-glycyl-DL-phenylalanine gave the cyclic tripeptide and not a hexapeptide. Neither does the tetraglycine peptide double its molecule upon ring closure. It is also known that c-glycyl-L-leucyl-glycyl-L-leucyl-glycyl is obtained from the thioester of the pentapeptide hydrobromide by self-cyclization. As has already been stated above the cyclic decapeptide of gramicidin is likewise obtained from the corresponding linear decapeptide without doubling of the molecule. It could not therefore have been foreseen that doubling would occur when L-valyl-L-ornithyl-L-leucyl-D-phenylalanyl-L-proline-pentapeptide is subjected to ring closure. The new process for synthesizing gramicidine is therefore surprising and of considerable importance owing to its simplicity. In the process of the invention the δ-amino group of the ornithine radical is protected during the reaction, preferably by the introduction of a radical capable of being split off without opening the ring, for example, an aryl sulphonyl radical such as tosyl, a polyarylmethyl radical such as trityl or an aryl-azoaryl-methoxy-carbonyl radical, such as a p-phenylazo-benzyloxy carbonyl or a p-methyoxy-phenylazo-benzyloxy carbonyl radical or the carbobenzoxy or trifluoroacetyl radical.

The alcohol part of the ester used as starting material is preferably derived from a phenol or a carbinol having one or more electron-attracting substituents, namely cyano, nitro, sulpho or methane-sulphonyl groups. Examples of such alcohol parts are those derived from cyanomethyl alcohol, para-nitrophenol or para-methane sulphonyl-phenol.

The salts of the peptide carboxylic acid esters used as starting materials, which contain in the alcohol part an electron-attracting substituent, can be prepared, for example, by reacting the N-triphenylmethyl-pentapeptide with a hydrohalic acid ester of the corresponding alcohol in the presence of a tertiary organic base followed by splitting off of the triphenyl methyl radical by treatment with a dilute acid, or by the catalytic hydrogenation of a corresponding ester of the N-carbobenzoxy-pentapeptide in the presence of an acid. Suitable salts for the process of the invention are particularly those of hydrohalic acids such as hydrochloric acid, hydrobromic or hydriodic acid or of halogenated fatty acids such as trifluoracetic acid.

As alkaline agents for carrying out the reaction there may be used, for example, inorganic bases such as alkali or alkaline earth metal hydroxides or carbonates, or organic bases preferably tertiary amines.

The process is preferably carried out in the presence of an organic solvent, such as dimethylformamide, acetonitrile, dioxane, tetrahydrofurane or a mixture of two or more such solvents; water also being present. The yield can be increased by the addition of an acid catalyst, for example, acetic acid or sulfuric acid to the peptide ester.

The following example illustrates the invention:

340 milligrams of L-valyl-Nδ-tosyl-L-ornithyl-L-leucyl-D-phenylalanyl-L-proline nitrophenyl ester trifluoracetate are dissolved in 6 cc. of dimethylformamide, 6 drops of glacial acetic acid are added, and the whole is introduced dropwise in the course of 5 hours, while stirring, at 55° C. into 70 cc. of pyridine. The mixture is then stirred for a further 2 hours at that temperature, and the solvent is then completely evaporated in vacuo. The residue is dissolved in 60 cc. of a mixture of methanol, isopropanol and water in the ratio 1:1:1, and the solution is filtered through two columns, one of a strongly basic ion exchanger and the other of a basic ion exchanger. The columns are again washed with 200 cc. of the same mixture, and the combined filtrates are evaporated to dryness in vacuo. The radical is crystallized from a mixture of methanol and water, whereby 125 milligrams of di-δ-tosyl-gramicidin S is obtained in the form of its dihydrate. The mother liquor is evaporated to dryness and the residue is chromatographed over 2 grams of aluminum oxide. 20 milligrams of a crude product are eluted with chloroform and ethyl acetate, and after recrystallization from a mixture of methanol and water the crude product yields 10 milligrams of pure di-tosyl-gramicidin S dihydrate. The total yield is therefore 135 milligrams, which is 31 percent of the theoretical yield.

The resulting product is converted into gramicidin S as follows:

60 milligrams of the dihydrate of di-tosyl-gramicidin S are dissolved in 20 cc. of liquid ammonia and 100 milligrams of sodium in small pieces are added. When the dissolution of the sodium is complete the solution remains blue. After the addition of a small amount of ammonium chloride the ammonia is evaporated and the residue is freed from the mercaptan formed in vacuo. The reaction product is taken up in absolute ethanol to which a few drops of a solution of hydrochloric acid in ethyl acetate have been added. After filtering the mixture the solvent is evaporated. The residue is dissolved in a few drops of ethanol of 65 percent strength and water is added at 50° C. until a distinct turbidity is produced. The dihydrochloride of gramicidin S then crystallizes in the form of needles melting at 268–270° C. with decomposition (the melting point tube being inserted at 250° C.).

The trifluoracetic acid salt of L-valyl-Nδ-tosyl-L-ornithyl-L-leucyl-D-phenylalanyl-L-proline para-nitrophenyl ester used as starting material can be prepared as follows:

500 milligrams of N-trityl-L-valyl-(Nδ-tosyl)-L-ornithyl-L-leucyl-D-phenylalanyl-L-proline (prepared, for example, as described in our application No. 616,923) and 800 milligrams of di-(para-nitrophenyl)-sulfite in 1.5 cc. of absolute pyridine are allowed to stand for 20 hours at room temperature. The reaction mixture is then diluted with ethyl acetate, extracted three times with a solution of citric acid and then with water, dried over sodium sulfate and evaporated to dryness in vacuo. The resin which remains behind is triturated with a mixture of ether and petroleum ether in the ratio 1:1, the nitrophenyl ester remaining behind in solid form. The yield is 550 milligrams which represents 98 percent of the theoretical yield.

435 milligrams of the nitrophenyl ester so obtained are dissolved in 10 cc. of trifluoracetic acid and 10 cc. of water are slowly added at —5° C. A precipitate of triphenylcarbinol is formed. The solvents are completely evaporated under a high vacuum at 30° C., and then the residue is triturated several times with a mixture of ether and petroleum ether in the ratio 1:1 and with absolute ether. 340 milligrams of the trifluoracetate are obtained in the form of a solid precipitate.

What is claimed is:

1. Process for the manufacture of gramicidin S, which comprises contacting a member selected from the group consisting of an acid addition salt of an L-valyl-L-ornithyl-L-leucyl-D-phenylalanyl-L-proline-methyl and phenyl in which the δ-amino group of the ornithine radical is protected and which contains in the alcohol component at least one carbon attached electron-attracting substituent, selected from the group consisting of carbonyl, sulfonyl, cyano and nitro groups with a tertiary organic nitrogen base, and converting the protected δ-amino groups into the free amino groups.

2. Process for the manufacture of gramicidin S, which comprises contacting an acid addition salt of an L-valyl-L-ornithyl-L-leucyl - D - phenylalanyl - L - proline - cyanomethyl ester in which the δ-amino group of the ornithine radical is protected with a tertiary organic nitrogen base, and converting the protected δ-amino groups into the free amino groups.

3. Process for the manufacture of gramicidin S, which comprises contacting an acid addition salt of an L-valyl-L-ornithyl-L-leucyl -D-phenylalanyl- L - proline - p - nitrophenyl ester in which the δ-amino group of the ornithine radical is protected with a tertiary organic nitrogen base, and converting the protected δ-amino groups into the free amino groups.

4. Process for the manufacture of gramicidin S, which comprises contacting an acid addition salt of an L-valyl-L-ornithyl-L-leucyl-D-phenylalanyl-L-proline - p - methansulfonyl-phenyl-ester in which the δ-amino group of the ornithine radical is protected with a tertiary organic nitrogen base, and converting the protected δ-amino groups into the free amino groups.

5. Process for the manufacture of gramicidin S, which comprises contacting a member selected from the group consisting of a trifluor acetate of an L-valyl-L-ornithyl-L-leucyl-D-phenylalanyl - L - proline-methyl and -phenyl ester in which the δ-amino group of the ornithine radical is protected and which contains in the alcohol component at least one carbon attached electron-attracting substituent, selected from the group consisting of carbonyl, sulfonyl, cyano and nitro groups with a tertiary organic nitrogen base, and converting the protected δ-amino groups into the free amino groups.

6. Process for the manufacture of gramicidin S, which comprises contacting a member selected from the group consisting of an acid addition salt of an L-valyl-L-ornithyl-L-leucyl-D-phenylalanyl-L-proline-methyl and -phenyl ester in which the δ-amino group of the ornithine radical is protected and which contains in the alcohol component at least one carbon attached electron-attracting substituent, selected from the group consisting of carbonyl, sulfonyl, cyano and nitro groups with a tertiary organic base, and converting the protected δ-amino groups into the free amino groups.

7. Process for the manufacture of gramacidin S, which comprises contacting in the presence of an acid catalyst a member selected from the group consisting of an acid addition salt of an L-valyl-L-ornithyl-L-leucyl-D-phenylalanyl-L-proline-methyl and -phenyl ester in which the δ-amino group of the ornithine radical is protected and which contains in the alcohol component at least one carbon attached electron-attracting substituent, selected from the group consisting of carbonyl, sulfonyl, cyano and nitro groups with a tertiary organic nitrogen base, and converting the protected δ-amino groups into the free amino groups.

References Cited in the file of this patent

Schwyzer et al.: Helvetic Chimica Acta, vol. 40, pp. 624–639 (1957).

Schwyzer et al.: Helvetic Chimica Acta, vol 38, pp. 69–91 (1955).

Schwyzer et al.: Angewandte Chemie, vol. 68, p. 518 (1956).

UNITED STATES PATENT OFFICE
CERTIFICATE OF CORRECTION

Patent No. 2,912,427                                           November 10, 1959

Robert Schwyzer et al.

It is hereby certified that error appears in the printed specification of the above numbered patent requiring correction and that the said Letters Patent should read as corrected below.

Column 3, lines 66 and 67, for "and phenyl in" read -- and -phenyl ester in --.

Signed and sealed this 28th day of June 1960.

(SEAL)
Attest:

KARL H. AXLINE                                                ROBERT C. WATSON
Attesting Officer                                           Commissioner of Patents